April 3, 1934.   P. DE SAMELSON ET AL   1,953,751
TRUCK
Filed July 23, 1932   3 Sheets-Sheet 1
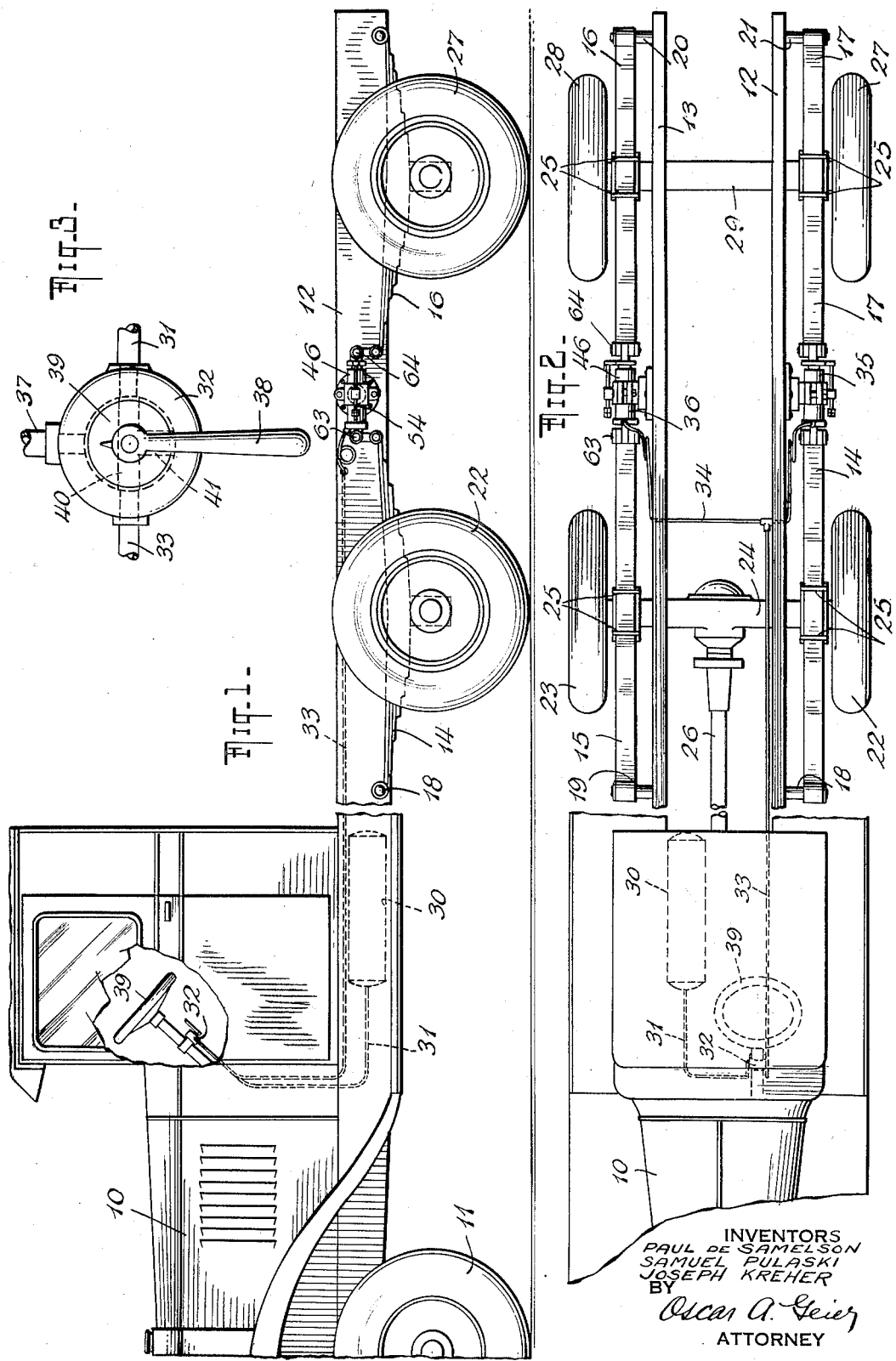
INVENTORS
PAUL DE SAMELSON
SAMUEL PULASKI
JOSEPH KREHER
BY
Oscar A. Geier
ATTORNEY

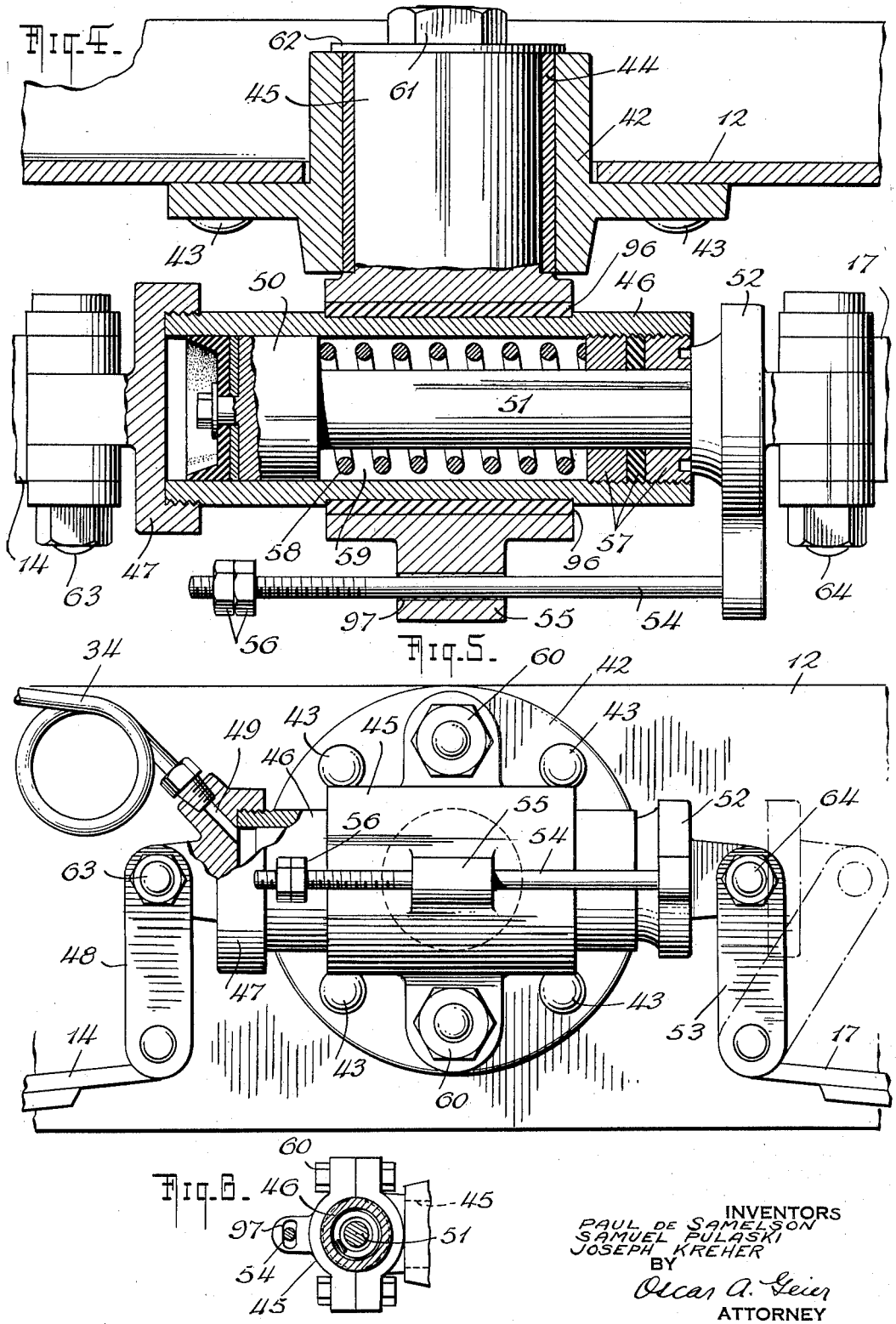

April 3, 1934. P. DE SAMELSON ET AL 1,953,751
TRUCK
Filed July 23, 1932 3 Sheets-Sheet 3
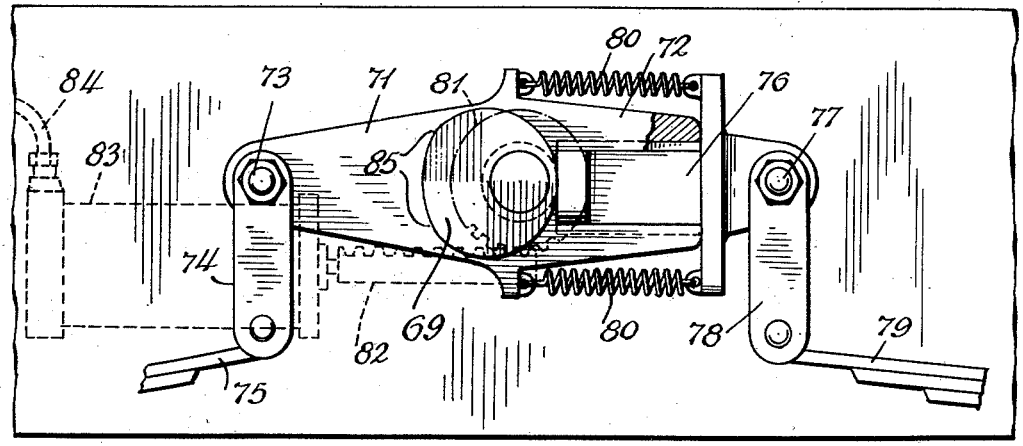
Fig-7-
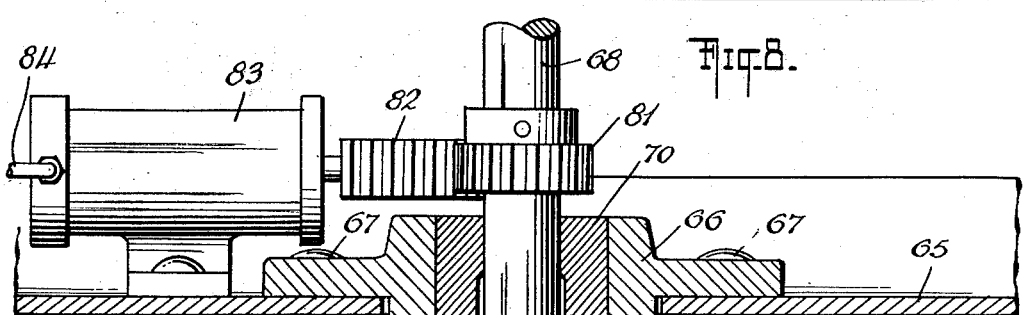
Fig.8.
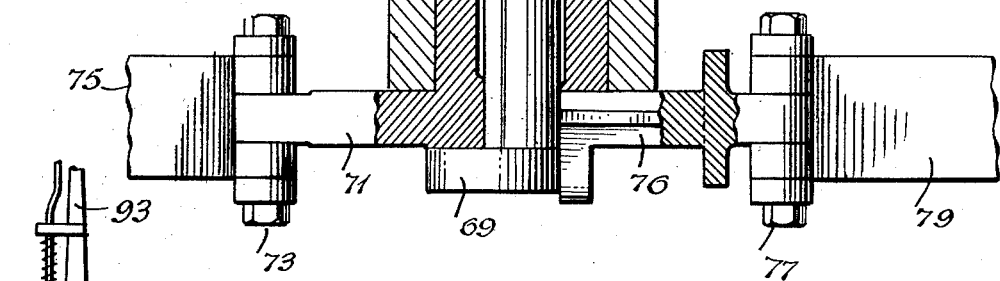
Fig.9.
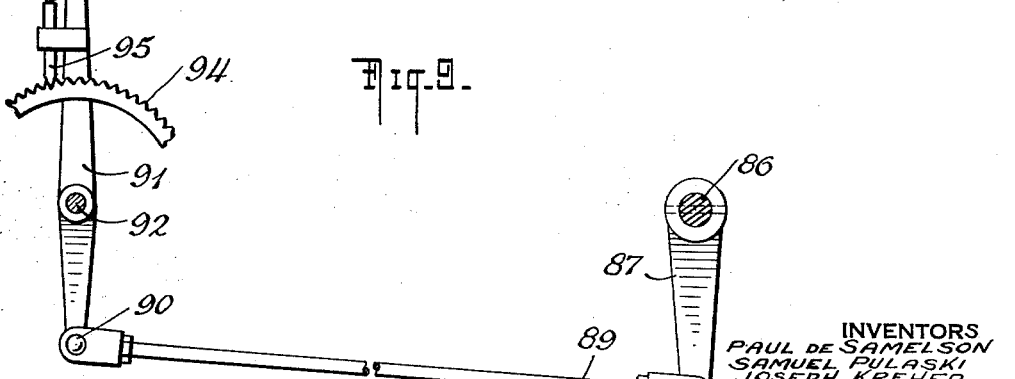
INVENTORS
PAUL DE SAMELSON
SAMUEL PULASKI
JOSEPH KREHER
BY
Oscar A. Geier
ATTORNEY Patented Apr. 3, 1934

1,953,751

UNITED STATES PATENT OFFICE 1,953,751

TRUCK

Paul de Samelson, New York, and Samuel Pulaski and Joseph Kreher, Brooklyn, N. Y.

Application July 23, 1932, Serial No. 624,210

16 Claims. (Cl. 280—104)

This invention relates to improvements in trucks and similar vehicles and refers more particularly to motor-driven trucks adapted to bear heavy loads and having a long body which necessitates the employment of six wheels to adequately support the body frame.

An object of this invention is to provide efficient means for changing or varying the portion of the total truck load supported by the traction wheels and the trailer wheels of the truck, respectively, said means being used to facilitate the starting of the truck on a slippery road and to keep the wheels of the truck firmly pressed on the surface of a rough road while the truck is in motion.

Another object of this invention is to provide a load distributing device which can be operated by the truck driver from his usual seat on the truck, thus eliminating the necessity for the truck driver to stop the truck and to descend from his seat in order that he may adjust the load distributing device.

A further object is to provide a load distributing device which can be operated by remote control through the use of compressed air or other fluid, a mechanical transmission or, in fact, any other suitable means which are used for the purpose of moving or controlling the movement of a body at a certain distance.

Still another object of this invention is to provide a device comprising arms some of which are attached to members connected with the traction wheels of a vehicle, while others are attached to members connected with the trailer wheels of said vehicle, the variation of the amount of load supported by some of said wheels being obtained by varying the length of some of said arms.

Yet another object of this invention is to provide a device for increasing the amount of load carried by the traction wheels of the truck, said device being actuated by an increase in the length of some of the members associated with the trailer wheels of the truck.

A further object is to provide an arm used for varying the load supported by some of the wheels of the truck, said arm comprising two telescoping members, one of which can be moved with respect to the other one by a fluid, a cam, a transmission mechanism or by any other suitable means.

The invention will appear more clearly from the following detailed description, when taken in connection with the accompanying drawings which illustrate preferred embodiments of the inventive idea.

In the drawings:—

Figure 1 shows a truck in side elevation.

Figure 2 is a top view of the truck shown in Figure 1.

Figure 3 shows a remote control valve in front elevation.

Figure 4 is a horizontal cross-section through the load-distributing mechanism.

Figure 5 is a front view of the mechanism shown in Figure 4 on a somewhat smaller scale, some of the parts being shown in cross-section.

Figure 6 is an end view of the device shown in Figures 4 and 5 on a smaller scale.

Figure 7 is a front view of another modification of this invention.

Figure 8 is a horizontal cross-section through the device shown in Figure 7.

Figure 9 shows diagrammatically mechanical means for operating the load-distributing mechanism.

Figures 1 to 5 show a truck having the usual source of motive power 10 and the steering wheels 11, one of which is shown in Figure 1. The frame of the truck comprises side bars 12 and 13 which are connected with two pairs of springs 14, 15, 16 and 17 by means of pins 18, 19, 20 and 21, as shown in Figure 2. The traction wheels 22 and 23 are journalled on the spindles of a transverse shaft 24 which carries the springs 14 and 15, said springs being clamped to the shaft 24 by means of cleats 25. The shaft 24 is driven by the motor of the truck through the medium of the usual transmission mechanism 26 shown diagrammatically in Figure 2.

A pair of trailer wheels 27 and 28 is journalled on the spindles of a transverse shaft 29 which carries the springs 16 and 17 clamped thereto by means of cleats 25.

A container 30 adapted to carry a fluid, which may be compressed air, or any other suitable gas or liquid, is supported by the truck frame 12, 13 (Fig. 1) and is connected therewith by any suitable means not shown in the drawings. A pipe 31 connects the container 30 with a remote control valve or a three-way cock 32 shown on a larger scale in Figure 3. Another pipe 33 connects the valve 32 with a U-shaped pipe 34 which leads to the load-distributing mechanism 35 and 36, shown in detail in Figures 4 and 5. A tube 37 shown in Figure 3 is used to connect the valve 32 with the exhaust which is not shown in the drawings.

A handle 38 of the valve 32 can be easily operated by the driver while the truck is in motion or while it is being started, since the valve 32 is attached to the axle of the steering means 39 of the truck. The handle 38 is adapted to be rotated together with the valve body 39 provided with passages 40 and 41. In the position of the handle shown in Figure 3 the passage 40 connects the pipe 31 with the pipe 33, so that the fluid within the container 30 is able to pass through the pipe 31, the valve 32, the pipe 33 and the pipe 34 to the load-distributing device 35, 36. In order to diminish or interrupt the supply of the fluid to the load-distributing device, the handle 38 must be rotated either to the left or to the right from the position shown in Fig. 3. If the handle 38 has been rotated to the left through an angle of ninety degrees, the pipe 33 will be connected with the exhaust pipe 37.

The load-distributing device 35 shown in detail and on a larger scale in Figures 4, 5 and 6, comprises a bracket 42 connected with the side bar 12 by means of rivets 43. The bracket 42 carries a bearing lining 44 supporting a member 45 which can oscillate with respect to the bracket 42. The member 45 consists of two halves which are connected by screws 60 and carries a cylinder 46 which is rotatable with respect to the member 45 and is supported by a lining 96. A disc-shaped end body 47 is screwed onto one end of the cylinder 46 and is pivoted at 63 to one end of a link 48, while the other end of the link 48 is pivoted to the spring 14. The member 47 is also connected with the pipe 34 and a passage 49 is formed within said member to enable the fluid coming from the pipe 34 to pass into the interior of the cylinder 46.

The cylinder 46 carries a piston 50 which is rigidly connected with a piston rod 51. The opposite end of the rod 51 is rigidly connected with a second end body 52 which is pivoted at 69 to a second link 53. The spring 17 is also pivoted to the link 53. A steering rod 54 which passes through an elongated opening 97 formed in a projection 55 forming a part of the member 45 is rigidly connected at one end with the end body 52 and carries at its other end the nuts 56, used to adjust the length of travel limit of the piston 50.

Guide and packing rings 57 are screwed into an end of the cylinder 46. A coil spring 58 is situated within a chamber 59 formed within the cylinder 46 by the piston 50 and the innermost packing ring 57. Screws 60 are used to connect the two halves of the member 45, as shown in Figure 6, while the screw 61 presses a joint disc 62 against the member 45 and the bracket 42 in order to keep the member 45 in place.

In the position shown in Figures 4 and 5 the load-distributing device is at rest so that each one of the axles 24 and 29 will carry the usual portion of the load. In order to increase the load carried by the axle 24, i. e. the traction wheels 22 and 23, the handle 38 is placed in the position shown in Figure 3. Then the fluid will pass from the container 30 through the pipe 31, the valve 32 and the pipes 33 and 34 into the load-distributing device 35, 36. Since the device 36 is similar in practically every respect to the device 35, only the latter one is here considered. The fluid enters into the interior of the cylinder 46 through the passage 49 and presses against the piston 50, pushing said piston to the right and compressing the spring 58. Since the pivot 64 moves together with the end body 52, the piston rod 51 and the piston 50, the length of the arm supporting the spring 17 will increase and will become greater than the length of the arm supporting the spring 14. The load on the spring 14 and consequently on the traction wheel 22 will increase to an extent corresponding to the increase in the length of the arm carrying the link 53 connected with the spring 17, as indicated diagrammatically by broken lines in Figure 5.

The entire arrangement is similar to balance scales, the two arms of which are connected with springs transmitting the load of the truck to its wheels, one arm of said scales being so constructed that it may be elongated through the provision of telescopic members.

The device 36 operates simultaneously with the device 35 and in the same manner.

In order to cut off the supply of the fluid to the load-distributing mechanism 35, 36, the driver must rotate the handle 38 until the communication of the pipe 31 with the pipe 33 is interrupted. In order to remove the fluid from the cylinder 46 and bring the load-distributing mechanism back to its original inoperative position, the driver must rotate the handle 38 still further until the valve 32 connects the pipe 33 with the pipe 37.

The modification shown in Figures 7 and 8 comprises a side bar 65 forming a part of the truck frame and a bracket 66 connected with the side bar 65 by means of rivets 67. A shaft 68 extending across the entire truck is rigidly connected at each of its ends with a cam 69, only one of which is shown in the drawings. Each of the ends of the shaft 68 is supported by a member 70 provided with two arms 71 and 72. The arm 71 is pivoted at 73 to one end of a link 74. The other end of the link 74 is pivoted to a spring 75 which is attached to an axle carrying the traction wheels of the truck and not shown in the drawings. The arm 72 has the shape of a fork and partly surrounds a member 76 which is pivoted at 77 to one end of a link 78. The other end of the link 78 is pivoted to a spring 79 attached to an axle, which is not shown in the drawings and which carries the trailer wheels of the truck. A pair of springs 80 is used to connect the member 76 with the member 70. The shaft 68 carries a toothed wheel or a pinion 81 rigidly connected with said shaft and adapted to be rotated by a rack 82 actuated by means of a device 83. The device 83 may be of any suitable construction and may comprise a piston, not shown in the drawings, which is connected with the member 82 and which is actuated by means of a fluid introduced into the device 83 through a pipe 84.

The mechanism shown in Figures 7 and 8 operates in a way similar to that of the mechanism shown in Figures 1 to 6. In order to increase the load carried by the traction wheels of the truck, it is necessary to introduce a fluid into the device 83 through the pipe 84. The fluid will push forward the rack 82 engaging the toothed wheel 81. The rack 82 while moving will rotate the pinion 81 and shaft 68 which is rigidly connected with the cam 69. The surface 85 of the cam 69 will come in contact with the member 76 and will push said piston forward against the action of the springs 80 thereby increasing the length of the arm which carries the spring 79 and consequently the load on the spring 75.

In order to bring the mechanism back to its original inoperative position it is necessary to move the rack 82 back into its position shown in Figure 8. This is accomplished by any usual means not shown in the drawings, for instance by the removal of the fluid from the device 83 and by the creation of a sub-atmospheric pressure in said device. The rack 82 will rotate the pinion 81 in an opposite direction and the cam 69 will return in its position shown in Figures 7 and 8. The springs 80 will move backwards the member 76, thus equalizing the length of the arms carrying the springs 75 and 79.

The modification illustrated in Figure 9 shows mechanical means for operating the cam shaft, instead of means actuated by a fluid. In Figure 9, 86 is a shaft which is similar to the shaft 68 and which can carry a cam, not shown in the drawings, said cam operating in the same manner as the cam 69 illustrated in Figures 7 and 8. The shaft 86 is rigidly connected with a lever arm 87 which is pivoted at 88 to a rod 89. The rod 89 is pivoted at 90 to a double armed lever 91 which is pivoted at 92 and is provided with a handle 93 which can be conveniently operated by the driver seated at the front end of the truck. The lever 91 is also provided with the usual locking device 94, 95.

By swinging the lever 91 the driver will move the rod 89 which will rotate the shaft 86 through the agency of the arm 87. A cam, not shown in the drawings, will rotate together with the shaft 86 and will increase or diminish the length of an arm carrying the springs, which are connected with the trailer axle of the truck.

All the modifications shown in the drawings refer to a load-distributing device which is operated by the driver from the driver's seat. Obviously, it is possible to employ other equivalent means for operating the load-distributing device by remote control than the actuating means shown in the drawings.

What is claimed is:—

1. In a truck, at least two separate load-carrying means, fluid-operated means connected with the load-carrying means and adapted to change the distribution of load between said separate load-carrying means, a separate container adapted to contain a fluid, and a pipe adapted to transmit said fluid and connecting said separate container with said fluid-operated means.

2. In a truck, a truck frame, an axle adapted to carry the traction wheels of the truck, means connecting said axle with said truck frame, another axle adapted to carry the trailer wheels of said truck, means connecting the second-mentioned axle with said truck frame, a container adapted to contain a fluid and carried by said frame, fluid-operated means connected with the two first-mentioned means and adapted to change the amount of load carried by at least one of said axles, and fluid-supplying means connecting said container with the third-mentioned fluid-operated means, the last-mentioned fluid-supplying means comprising a remote control valve.

3. In a truck, at least two separate load-carrying means, a support, means carried by said support and oscillatable with respect thereto, the last-mentioned means being connected with the load-carrying means, and remotely controlled fluid-operated means for oscillating the second-mentioned oscillatable means, whereby the distribution of load between said load-carrying means is changed.

4. A load distributing device for trucks and other vehicles, comprising at least two separate load-carrying means, a support, a member carried by said support and adapted to oscillate with respect thereto, an arm connected with said member and with one of said load-carrying means, another movable and extensible arm connected with said member and with the other of said load-carrying means, and remotely controlled fluid-operated means for moving the second-mentioned arm, whereby the distribution of load between said load-carrying means is changed.

5. In a truck, a truck frame, an axle adapted to carry the traction wheels of the truck, a spring connected with said frame and said axle, another axle adapted to carry the trailer wheels of said truck, another spring connected with said frame and the second-mentioned axle, a plurality of arms, at least one of said arms comprising two telescoping members, means connecting said arms with said springs, and means connecting said arms with said frame.

6. In a truck, a truck frame, an axle adapted to carry the traction wheels of the truck, a spring connected with said frame and said axle, another axle adapted to carry the trailer wheels of said truck, another spring connected with said frame and the second-mentioned axle, a plurality of arms, at least one of said arms comprising two telescoping members, means connecting said arms with said springs, means connecting said arms with said frame, and means for moving one of said two telescoping members with respect to the other member for the purpose of varying the length of the arm which comprises said members.

7. In a truck, a truck frame, an axle adapted to carry the traction wheels of the truck, a spring connected with said frame and said axle, another axle adapted to carry the trailer wheels of said truck, another spring connected with said frame and the second-mentioned axle, a plurality of arms, at least one of said arms comprising two telescoping members, means connecting said arms with said springs, means connecting said arms with said frame, and remotely controlled means for moving one of said two telescoping members with respect to the other member for the purpose of varying the length of the arm which comprises said members, the last-mentioned means being adapted to be operated at a distance from said arms.

8. In a truck, a truck frame, an axle adapted to carry the traction wheels of the truck, a spring connected with said frame and said axle, another axle adapted to carry the trailer wheels of said truck, another spring connected with said frame and the second-mentioned axle, a member, means for movably supporting said member in said frame, another member associated with and movable with respect to the first-mentioned member, one of said members at least partly surrounding the other of said members, means for connecting the first-mentioned spring with one of said members, and means for connecting the second-mentioned spring with the other of said members.

9. In a truck, a truck frame, an axle adapted to carry the traction wheels of the truck, a spring connected with said frame and said axle, another axle adapted to carry the trailer wheels of said truck, another spring connected with said frame and the second-mentioned axle, a member, means for movably supporting said member in said frame, another member associated with the first-mentioned member, resilient means cooperating with the second-mentioned member, remotely controlled means for moving the second-mentioned member with respect to the first-mentioned member, the first-mentioned member at least partly surrounding the second-mentioned member, means for connecting the first-mentioned spring with the first-mentioned member, and means for connecting the second-mentioned spring with the second-mentioned member.

10. A load distributing device for trucks and other vehicles, comprising two separate load-carrying means, a support, a member carried by said support and adapted to oscillate with respect thereto, another member connected with the first-mentioned member and with one of said load-carrying means, and a third member at least partly surrounded by the second-mentioned member and movable with respect thereto, the third-mentioned member being connected with the other of said load-carrying means.

11. A load distributing device for trucks and other vehicles, comprising two separate load-carrying means, a support, a member carried by said support and adapted to oscillate with respect thereto, an arm connected with said member and with one of said load-carrying means, and another extensible arm connected with said member and with the other of said load-carrying means.

12. In a truck, a truck frame, an axle adapted to carry the traction wheels of the truck, a spring connected with said frame and said axle, another axle adapted to carry the trailer wheels of said truck, another spring connected with said frame and the second-mentioned axle, a member carried by said frame and adapted to oscillate with respect thereto, a cylinder carried by said member, means for connecting the first mentioned spring with said cylinder, a piston within said cylinder, means for connecting the second mentioned spring with said piston, resilient means within said cylinder associated with said piston, and remotely controlled means for moving said piston within said cylinder.

13. In a truck, a truck frame, an axle adapted to carry the traction wheels of the truck, a spring connected with said frame and said axle, another axle adapted to carry the trailer wheels of said truck, another spring connected with said frame and the second-mentioned axle, a member carried by said frame and adapted to oscillate with respect thereto, a cylinder carried by said member, means for connecting the first mentioned spring with said cylinder, a piston within said cylinder, means for connecting the second-mentioned spring with said piston, resilient means within said cylinder associated with said piston, a fluid container within said frame, and means for connecting said container with said cylinder, the last-mentioned means comprising a valve adapted to interrupt the flow of said fluid to said cylinder.

14. In a truck, a truck frame, an axle adapted to carry the traction wheels of the truck, a spring connected with said frame and said axle, another axle adapted to carry the trailer wheels of said truck, another spring connected with said frame and the second-mentioned axle, a member carried by said frame and adapted to oscillate with respect thereto, said member comprising an arm and a second fork-shaped arm; means for connecting the first-mentioned spring with the first-mentioned arm, a piston-shaped member partly surrounded by the second-mentioned arm, resilient means connecting said piston-shaped member with the first-mentioned member, and means for moving said piston-shaped member with respect to the second-mentioned arm.

15. In a truck, a truck frame, an axle adapted to carry the traction wheels of the truck, a spring connected with said frame and said axle, another axle adapted to carry the trailer wheels of said truck, another spring connected with said frame and the second-mentioned axle, a member carried by said frame and adapted to oscillate with respect thereto, said member comprising an arm and a second fork-shaped arm; means for connecting the first-mentioned spring with the first-mentioned arm, a piston-shaped member partly surrounded by the second-mentioned arm, resilient means connecting said piston-shaped member with the first-mentioned member, a shaft supported by the first-mentioned member, a cam rigidly connected with said shaft and adapted to come in contact with said piston-shaped member, and means for moving said shaft.

16. In a truck, a truck frame, an axle adapted to carry traction wheels of the truck, a spring connected with said frame and said axle, another axle adapted to carry the trailer wheels of said truck, another spring connected with said frame and the second-mentioned axle, a member carried by said frame and adapted to oscillate with respect thereto, said member comprising an arm and a second fork-shaped arm; means for connecting the first-mentioned spring with the first-mentioned arm, a piston-shaped member partly surrounded by the second-mentioned arm, resilient means connecting said piston-shaped member with the first-mentioned member, a shaft supported by the first-mentioned member, a cam rigidly connected with said shaft and adapted to come in contact with said piston-shaped member, a toothed wheel rigidly connected with said shaft, a rack engaging said toothed wheel, and means for moving said rack.

PAUL DE SAMELSON.
SAMUEL PULASKI.
JOSEPH KREHER.